May 15, 1928.  1,669,820
R. F. GRANT ET AL
METHOD AND MEANS FOR EFFECTING THE SEPARATION OF SUBDIVIDED MATERIALS
Filed Sept. 7, 1926   3 Sheets-Sheet 1
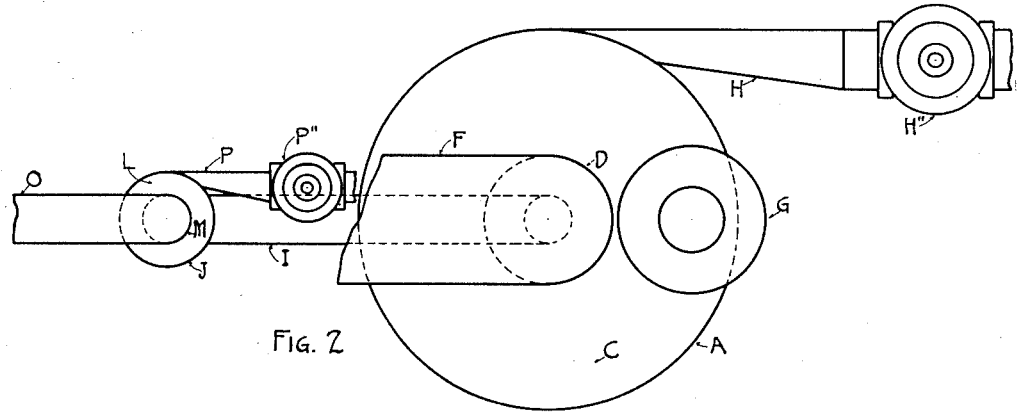
FIG. 2
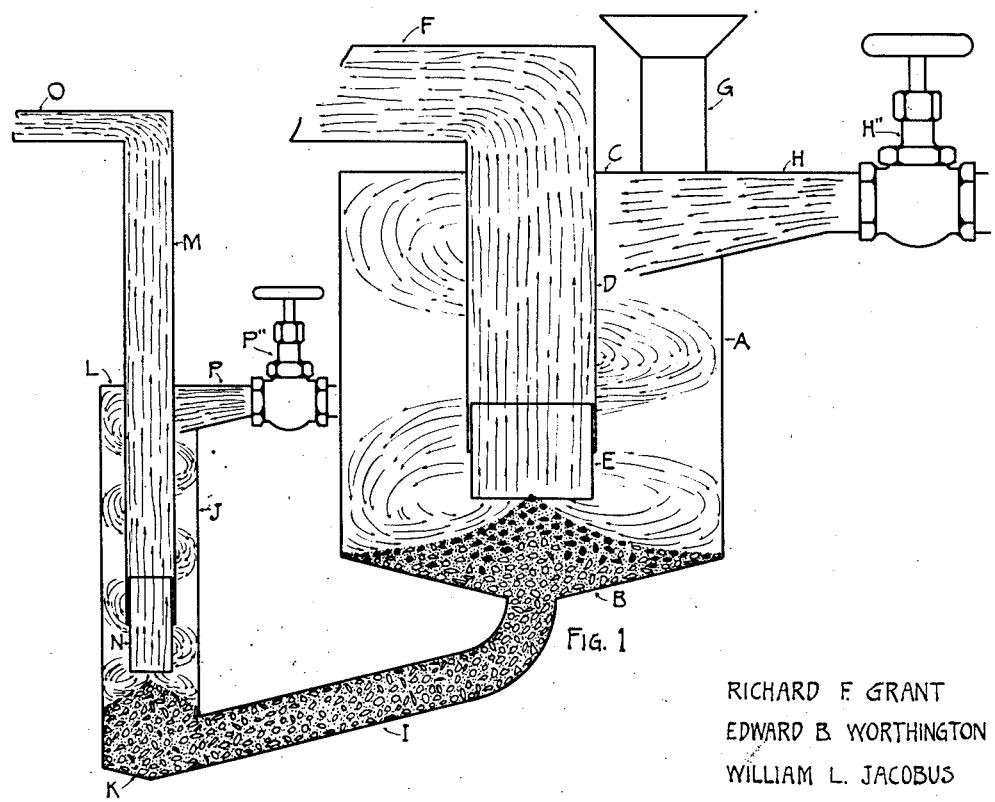
FIG. 1
RICHARD F. GRANT
EDWARD B. WORTHINGTON
WILLIAM L. JACOBUS
INVENTORS
BY 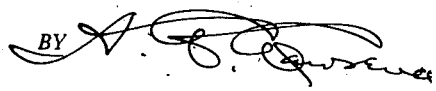
ATTORNEY.

May 15, 1928.

R. F. GRANT ET AL 1,669,820

METHOD AND MEANS FOR EFFECTING THE SEPARATION OF SUBDIVIDED MATERIALS

Filed Sept. 7, 1926   3 Sheets-Sheet 2

RICHARD F. GRANT
EDWARD B. WORTHINGTON
WILLIAM L. JACOBUS
INVENTORS.

BY

ATTORNEY.

RICHARD F. GRANT
EDWARD B. WORTHINGTON
WILLIAM L. JACOBUS
INVENTORS

ATTORNEY.

Patented May 15, 1928.

1,669,820

UNITED STATES PATENT OFFICE.

RICHARD F. GRANT, OF BRATENAHL, OHIO, AND EDWARD B. WORTHINGTON, OF FORTY FORT, AND WILLIAM L. JACOBUS, OF WILKES-BARRE, PENNSYLVANIA, ASSIGNORS TO SUSQUEHANNA COLLIERIES COMPANY, OF WILKES-BARRE, PENNSYLVANIA, A CORPORATION OF PENNSYLVANIA.

METHOD AND MEANS FOR EFFECTING THE SEPARATION OF SUBDIVIDED MATERIALS.

Application filed September 7, 1926. Serial No. 133,841.

Our invention relates both to suitable apparatus and the method or procedure facilitated thereby, whereby subdivided materials of different specific gravities may be readily separated for various purposes in the arts; our general object being to accomplish such separation rapidly, efficiently and cheaply.

Suitable apparatus for practicing our invention depends upon the wet concentration of the desired product from a stratified bed produced by the action of a vortex from which the material of less specific gravity is carried to a predetermined level for discharge, while the material of greater specific gravity is removed from the lower stratum, preferably by the action of a secondary vortex discharging at substantially the same predetermined level, and in balanced relation with the discharge from the first named vortex.

This invention relates to improvements in methods of wet concentration of ores, coal and other materials, the object thereof being to provide ways and means which will cheaply and efficiently separate particles of lighter specific gravity from heavier particles. The procedure involved contemplates the use of the stratifying action of a rotating bed of lighter and heavier particles that are held in partial suspension by a rotating body of liquid and means for separately withdrawing the lighter and heavier particles while maintaining the rotating bed in a substantially uniform condition.

It is an object of this invention to provide ways and means for concentration that are nearly automatic in action and which do not require constant attendance and regulation to compensate for fluctuations in character and amount of material treated.

It is a further object of this invention to provide ways and means for concentration that are equally adapted to the treatment of coarse and fine material and in which the range of sizes simultaneously treated is greater than in most methods of wet concentration.

It is a still further object of this invention to provide ways and means for concentration that are cheap in first cost, operation and maintenance and that have large unit capacity.

It is also an object of this invention to provide ways and means for concentration that are compact, light in weight and which have no reciprocating parts resulting in vibration in the machine and mill building.

For the purpose of carrying out our invention and attaining the stated objects thereof, we have devised improved apparatus operating upon novel and simple principles hereinafter explained, whereby the vortically formed stratified bed is retained relatively intact during the removal of the respective subdivided and stratified materials from different levels or portions of said bed.

Our improved procedure and apparatus may best be explained by making reference to the accompanying drawings showing diagrammatically two modified but analogous types of apparatus for effecting vortical separation, wherein:

Figure 1, is a diagrammatic view in cross section which illustrates one type of suitable vortical separator apparatus for practicing our instant method, Fig. 2, is a plan view thereof.

Figure 3:
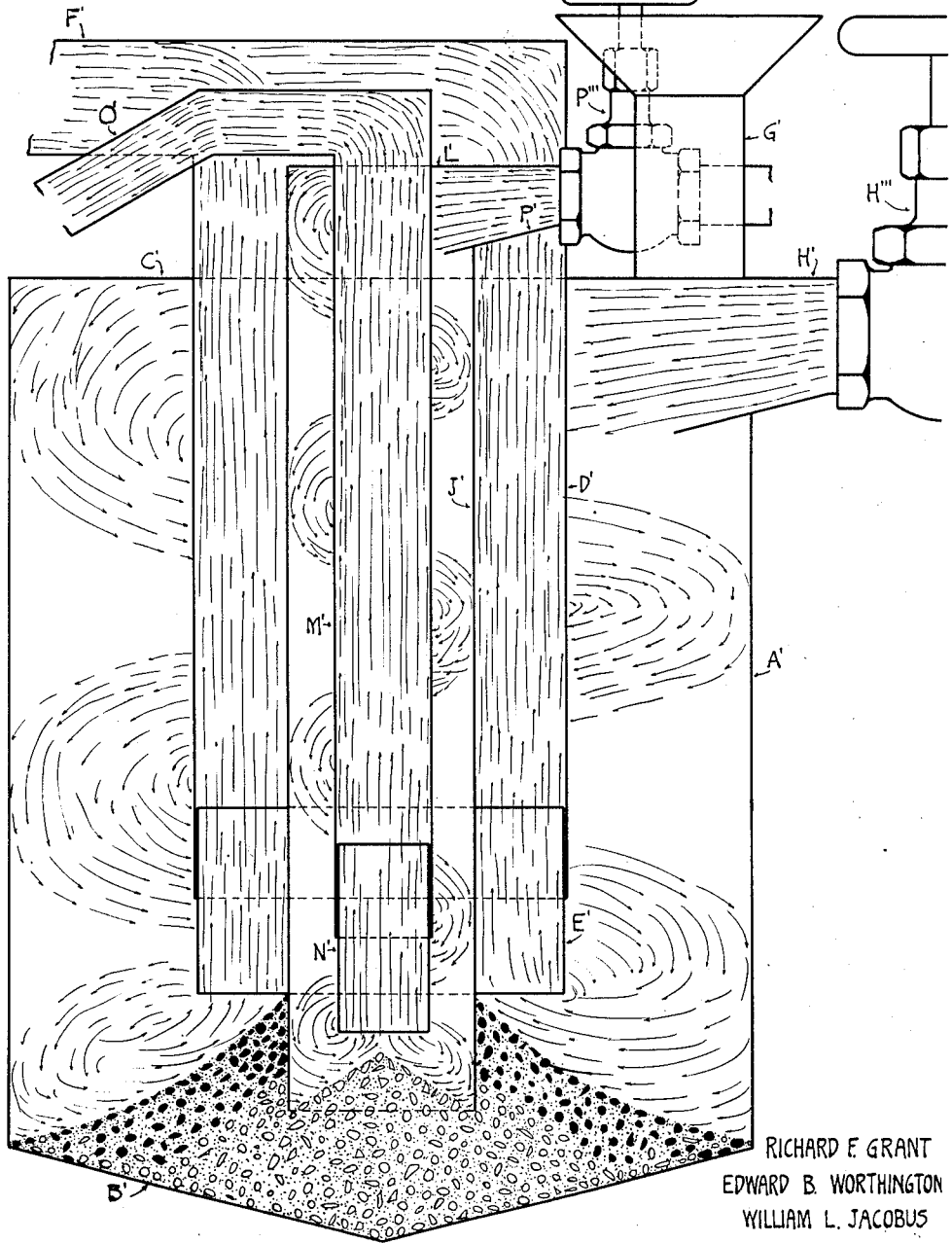
Fig. 3, is another diagrammatic view in cross section and upon a larger scale, illustrating a modified type of vortical separator.

Throughout the different figures of the drawings we have employed the same characters of reference to indicate identical parts, or primed characters of reference, respectively, to indicate analogous parts. Moreover, since we have described the specific separation of subdivided coal and slate, we have shown the stratified beds thereof diagrammatically in black and slate, better to indicate the method involved.

Various types of apparatus have from time to time been devised for wet concentration which have attempted to use the stratifying action of a rotating body of water. These devices have been inefficient or useless in practice because they embodied no method of removing the separated materials without disturbing or destroying the stratification of the rotating bed of material and thereby for practical purposes the desired action and result have not heretofore been attained. In the process herein described, however, these difficulties are completely and satisfactorily overcome and the necessary substantially uniform and undisturbed conditions in the rotating beds are at all times maintained. The result is an almost perfect separation which cannot even be approximated by any device heretofore constructed.

The principles involved may be used in a number of forms of apparatus and the following description is only one modification which has given good results in practice.

Referring to the drawings (see Figs. 1 and 2):

A is a cylindrical receptacle with conical bottom B and closed top C through which a cylindrical discharge pipe D extends, which is concentric with A. This constitutes the separating chamber. At the lower end of D is a vertically adjustable cylindrical member E and at the top is a discharge launder F.

Thru the top C and near the circumference of A is a vertical feed pipe G which extends above the horizontal plane of the discharge launder F.

Near the top of the receptacle A and tangent to it at its circumference is a rectangular water inlet H which is connected to a source of water supply that is under pressure.

Attached to the conical bottom B and concentric with it is a curved discharge pipe I which is attached at its lower end to the side and lower portion of a cylindrical receptacle J which has a conical bottom K and a closed top L through which a cylindrical discharge pipe M extends which is concentric with J.

At the lower end of M is a vertically adjustable cylindrical member N and at the top and in the same horizontal plane with discharge launder F is a discharge launder O.

Near the top of the receptacle J and tangent to it at its circumference is a rectangular water inlet P which is connected to a source of water supply that is under pressure.

In operation the action within this apparatus is as follows, taking for the purpose of illustration the separation of the finer sizes of anthracite coal from their associated slate particles.

Water under pressure is introduced through the water inlets H and P. Due to the velocity of the water the air which is trapped in the apparatus is swept out and displaced by water which is in a rotary motion in the receptacles A and J. The water rises through the discharge tubes D and M and overflows through the launders F and O. The volume of water introduced at H and P under pressure is regulated to the amount required for separation and removal of the materials involved.

The coal and slate particles which are to be separated are introduced through the feed pipe G. As these particles enter the receptacle A they meet the rotating downwardly moving body of water which fills this vessel and are thrown to the outer walls and settle, traveling in helical paths to the outer circumference of the conical bottom B.

As more coal and slate are introduced the particles build up a bed which fills the lower part of receptacle A, the discharge tube I and the lower part of the receptacle J.

Due to the whirling action of the water the particles in the beds in both A and J are maintained in a condition of rotary motion, the velocity of the particles in the upper portions of both beds being greater than in the lower portions so that the particles in the upper portions of these beds remain in a condition of partial suspension and the beds assume a conical form which is rotating as indicated in the drawings.

The separation of the coal from the slate particles takes place entirely within and upon the revolving conical bed in receptacle A and is due entirely to the lighter specific gravity and decreased frictional resistance of the coal particles as compared with the higher specific gravity and increased frictional resistance of the slate particles.

These differences are made effective for the purpose of separation by the fact that all of the particles are in rotary motion in close proximity to each other under conditions which result in remarkable stratification and separation.

At the circumference of the rotating bed practically all of the particles are in complete suspension and travel with the same velocity. As they approach the center, owing to the decreased velocity, greater specific gravity and increased frictional resistance, the slate particles are rapidly retarded and settle to the bottom of the rotating bed while the coal particles, owing to their lighter specific gravity and less frictional resistance, remain more or less in suspension, traveling in a rotary path and building up an apex of a cone which is rotating.

By proper adjustment of the vertically movable cylindrical member E the particles of coal that constitute the rotating apex of the cone, are swept up by the water rising through the discharge pipe D and are transported to the overflow launder F.

The slate particles settle out through the discharge tube I into the lower portion of the receptacle J. As these particles enter J they are subjected to the rotary motion of the water in this receptacle and the particles in the upper portion of this bed assume a rotary motion and are placed in a state of more or less complete suspension, so that the upper part of this rotating bed also assumes a conical form as indicated in the drawings.

By proper adjustment of the vertically movable cylindrical member N these slate particles at the apex of the cone are then swept up by the water rising through the discharge tube M, and are transported to the overflow launder O.

The rate of movement of the slate particles through the discharge tube I is entirely controlled by the height of the revolving slate cone in receptacle J so that by proper proportion and adjustment of the parts the action of the whole apparatus is practically uniform under wide fluctuations in character and amount of the material treated.

In other words, with varying rates of feed containing approximately uniform proportions of coal and slate, the rate of discharge of coal through launder F and of slate through launder O is proportional, through wide ranges of the amount of material treated in unit time, maintaining at the same time approximately uniform conditions in the rotating beds in receptacle A and receptacle J and equal efficiency in separation.

The same condition obtains also under conditions of uniform rates of feed containing varying proportions of coal and slate so that within wide ranges the apparauts is automatic in its action under fluctuations both in amount and character of feed.

It should be clearly understood that analogous forms of apparatus utilizing these principles have been described and that other forms based on the same action have been constructed and operated with satisfactory results; also that while the separation of the finer sizes of anthracite coal from slate has been described as a specific illustration of reduction to practice, the apparatus and principles employed are equally adapted to the separation of other materials.

Figure 4:
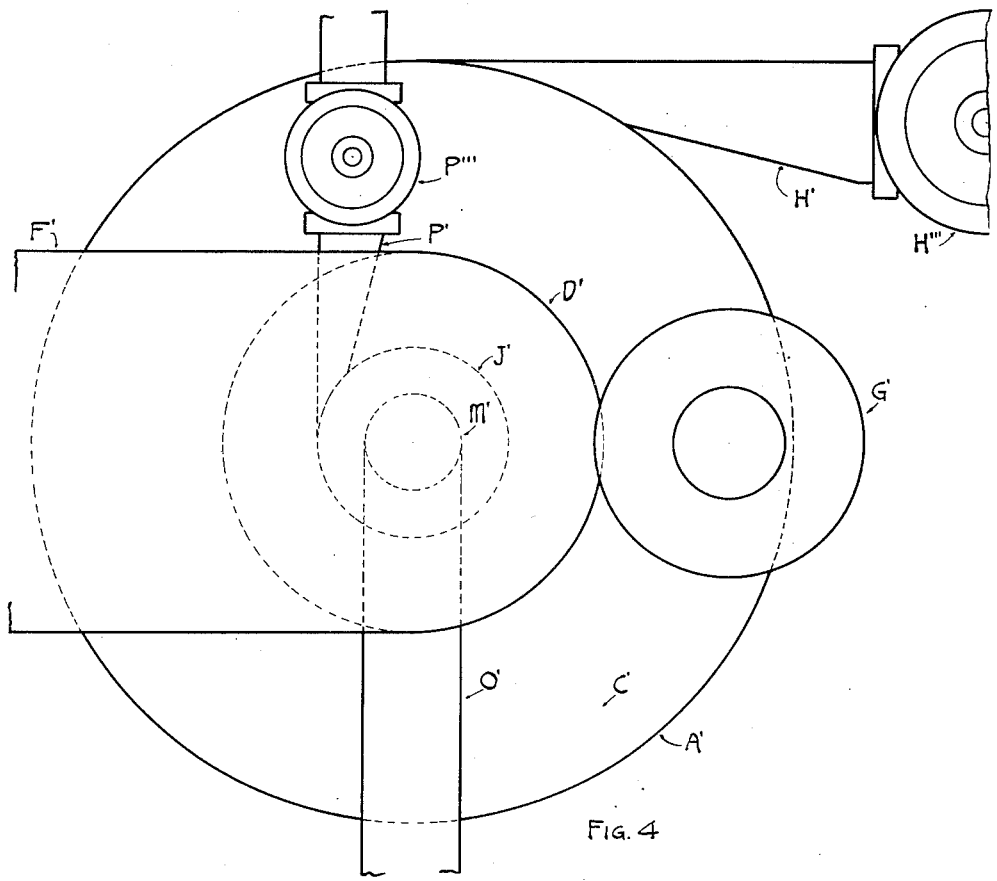
Fig. 4, is a plan view thereof.

In Figures 3 and 4, we have shown a modified type of apparatus in diagrammatic form equally adapted for practicing our improved method and structurally embodying our invention in more compact form, although shown upon a little larger scale. Therein the separating chamber A' is provided with an unperforated bottom B' and the hydraulic inlet H' at the upper portion of said chamber.

The mixed subdivided material is introduced laterally through the inlet G', while concentric discharge tubes D' and M', respectively provided with adjustable terminal sections E' and N', discharge through the superposed launders F' and O'. In this type of apparatus no exterior vortex is maintained for effecting the discharge of the material of higher specific gravity, such as the slate particles, although the operation of the two types of apparatus is essentially the same, and the balancing action from the respective discharge outlets is identical.

The introduction of water under pressure at H' will promptly cause the formation of a stratified bed of the materials of different specific gravity in the conical bottom portion B' from which the lighter subdivided material is swept upwardly from the bottom vortex into the discharge passage D' and out of the launder F', while the heavier subdivided material is withdrawn from a lower portion of the stratified bed into the discharge passage M' N', through the action of the jet from P' acting interiorly of the annular passage J', as indicated in Fig. 3 by the darts. Thus the subdivided material, such as coal and slate, will be separated and promptly discharged from the launders F' and O' automatically, as previously described.

Figure 5:
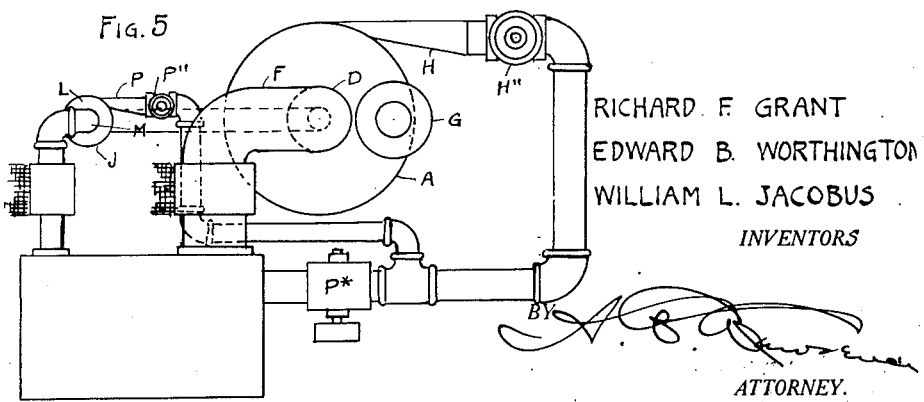
Fig. 5 is a diagrammatic view illustrating a water circulatory system.

The recognized practice in operating vortical separators of using the water over and over again by means of a circulatory pump P*, of course, preferably is adopted in practicing our invention, as diagrammatically shown in Fig. 5, while the respective water supplies under pressure for forming the vortices and stratified beds are controllable in the usual manner of the art, as by independent valves H'', P'' and H''', P''', and require no specific description, since this feature is well understood by those skilled in the art.

It will be appreciated that in handling materials to be separated having a content so finely divided as to be classified as slimes, it is difficult, if not impossible, to secure stratification of the material composing said slimes, even though they possess different specific gravities. This is due to the fact that slime materials are so finely divided that their particles present relatively great surface exposure and they therefore tend to float or be carried along together in any form of liquid motion regardless of their specific gravity.

Accordingly, as a preliminary step to final concentration or separation of various subdivided materials, in event that it is desired to remove slimes from such materials of different specific gravities, this may readily be accomplished as follows, taking the removal of slimes from subdivided coal and slate, as an example. The slate, coal and slimes are introduced in intermixed condition through G or G', to the separating chamber, but the water volume entering at H and P, or H' and P', is so reduced that both the subdivided slate and coal will settle to the bottom B, or B', and are removed together through I, J and O, or N', M', and O'. The slimes thus are maintained in suspension and are swept out through D and F, or D' and F', depending upon which of our improved vortical separators is employed. After such removal of the slimes, the coal and slate may then be separated as above described.

From the foregoing it will be appreciated that our improved procedure insures conditions not only for cleaning the mixed subdivided material initially, but for maintaining stratification of the mixed material fed into the vortical separating chamber, while the balanced withdrawals and discharges from the upper surface and a lower portion of said stratified bed, respectively, at a given or adjusted position, and a given or predetermined level of discharge from the respective launders, insures a continuing and substantially automatic separating action.

The employment of primary and secondary vortical hydraulic chambers in this balanced relation disclosed, is preferable, although not necessary to the practice of our invention, since other means insuring the undisturbed condition of stratification in the separating chamber may be adopted for obtaining the withdrawal of the heavier subdivided material from a lower portion or sub-surface position of the stratified body or bed.

Having now described apparatus embodying our invention and adapted for practicing the novel method of effecting vortical separation, we claim as new and desire to secure by Letters Patent, together with such modifications of ways and means as may be accomplished by those ordinarily skilled in the art, the following:

1. The herein described method of effecting vortical separation, which consists in subjecting the subdivided material to the action of a vortex for obtaining the substantially horizontal stratification of the portions thereof of different specific gravities, meanwhile removing upwardly the material of lighter characteristics from the upper stratum and the material of heavier characteristics from the lower stratum.

2. The herein described method of effecting vortical separation, which consists in subjecting the subdivided mixed material to the action of a continuing vortex for obtaining the substantially horizontal stratification of the portions thereof of different specific gravities, meanwhile removing the material of less specific gravity from the upper stratum by the overflow of liquid from the vortex, and removing the material of greater specific gravity from the lower stratum by a graduated withdrawal of a portion of the liquid beneath the stratified material.

3. The herein described method of effecting vortical separation, which consists in subjecting the subdivided mixed material to a continuing liquid flow and vortex for obtaining the stratification of the portions thereof in accordance with their specific gravities respectively, meanwhile removing the material of less specific gravity from the upper stratum and the material of greater specific gravity from the lower stratum without substantial disturbance of stratification by insuring the discharge overflow at a given level of the charged liquids derived both from the surface and the lower portion of the stratified material.

4. The herein described method of effecting vortical separation of subdivided materials, which consists in subjecting intermixed materials to a continuing hydraulic vortex and obtaining the stratification thereof in accordance with their approximate specific gravities, regulating the overflow from the stratified bed thus produced to insure the withdrawal of subdivided material from the surface of said bed at a given discharge level, and subjecting the underflow from said bed to a secondary vortical action to insure the withdrawal of subdivided material from the lower portion of said bed and its discharge at approximately the first named discharge level.

5. The herein described method of effecting vortical separation of mixed subdivided materials, which consists in subjecting the materials to successive actions of the hydraulic vortex respectively regulated to insure and maintain a stratified bed of separated materials, meantime insuring the withdrawal of subdivided materials respectively from the upper surface and from the lower portion of said bed by respective liquid flows maintained at approximately the same level of discharge, whereby the stratification of the bed is maintained in substantially undisturbed condition.

6. In apparatus of the class described, the combination with a vortical separating chamber, including means for supplying fluid thereto, of a superposed launder and its connecting pipe positioned intermediately of said chamber, a discharge launder approximately at the level of the first named launder, a conduit connecting the lower portion of said chamber with the second launder, and means for effecting the discharge of the materials respectively separated in the vortical chamber through the two launders.

7. In apparatus of the class described, the combination with a vortical separating chamber, of a secondary vortical discharge chamber operatively connected with the lower portion thereof, launders respectively connected with each of said chambers, and means for supplying controllable quantities of fluid under pressure respectively to said chambers, the fluid pressure to the secondary chamber being adapted to control the discharge from the primary chamber.

8. In apparatus of the class described, the combination with a vortical separating chamber, of a secondary vortical discharge chamber connected with the lower portion thereof, superposed launders respectively connected with said chambers and having their discharge openings at approximately the same level, and means for supplying controllable quantities of fluid under pressure respectively to said chambers.

9. In apparatus of the class described, the combination with a vortical hydraulic separating chamber, of hydraulic means for maintaining a stratified bed of subdivided material in the lower portion of said chamber, launders at approximately a common level connected to said chamber for discharge above and below the position of the stratified bed, and means for effecting the withdrawal of the heavier subdivided material without disturbing the stratification of the bed.

10. In apparatus of the class described, the combination with a vortical hydraulic separating chamber, of hydraulic means for maintaining therein a stratified bed of subdivided material, a superposed launder adapted to discharge at a given level, a discharge chamber connected with the lower portion of the separating chamber, a second launder therefor adapted to discharge at the first named given level and afford a balancing hydraulic column, and means associated with the discharge chamber for effecting a discharge through the second launder.

11. In apparatus of the class described, the combination with a vortical hydraulic separating chamber, of controllable hydraulic means for maintaining therein a stratified bed of subdivided material, two discharge conduits extending from different positions therein, and means for adjusting their respective positions of withdrawal from said chamber.

12. In apparatus of the class described, the combination with a vortical separating chamber, of hydraulic means for maintaining therein a stratified bed of subdivided material, two discharge conduits, launders connected with each positioned at approximately the same level, and means for adjusting the respective positions of withdrawal of said conduits relative to said stratified bed.

13. The herein described method of separating subdivided coal from a heavier ash content, which consists in subjecting the mixture to the action of a continuing hydraulic vortex in sufficiently quiescent condition horizontally to maintain stratification of a rotating bed thereof, withdrawing the coal from the upper portion of said bed and discharging it by the flow of water at a given level, withdrawing the ash content from another portion of said bed, and maintaining a secondary circulatory flow of water, thereby discharging said ash content at approximately the first named level.

14. The herein described method of separating coal and slate in mixed subdivided form, which consists in subjecting the mixture to vortical hydraulic action, meanwhile availing of the different frictional coefficients and specific gravities to build up and maintain a stratified rotating bed, withdrawing the coal by an upper flow of water sufficient to cause its travel relative to the slate and carry it to a given level of discharge, and withdrawing the slate from another portion of the bed and discharging it at approximately the first named level as a continuing process and without disrupting the stratified bed.

15. The herein described method of cleaning and separating smaller sizes of coal, which consists in subjecting the mixed subdivided material to vortical hydraulic action with reduced flow of water sufficient only to separate the slimes, and then to vortical hydraulic action with an adequate flow of water sufficient to maintain stratification of the coal and slate contents, withdrawing said coal and slate from different positions of said bed, and respectively discharging them at approximately the same level.

16. The herein described method of desliming and separating subdivided materials of different specific gravities, which consists in subjecting the mixed subdivided materials to vortical hydraulic action with reduced flow of water sufficient only to separate and carry away the slimes, and then to vortical hydraulic action with an adequate flow of water sufficient to effect and maintain stratification of the materials of different specific gravities in a rotating bed, withdrawing said materials from different positions of said bed, and respectively discharging the separated materials at approximately the same level.

17. The herein described method of effecting vortical separation, which consists in subjecting the mixed subdivided materials to a continuing flow of water in a vortex for obtaining stratification, maintaining such stratification thereof in accordance with the respective specific gravities as a rotating bed, and removing the material of less specific gravity from an upper stratum of the bed and material of greater specific gravity from a different portion of said bed without substantial disturbance of its stratification.

In testimony whereof, we do now affix our signatures at Wilkes-Barre, Pennsylvania, this 3rd day of September, A. D., 1926.

RICHARD F. GRANT.
EDWARD B. WORTHINGTON.
WILLIAM L. JACOBUS.